United States Patent [19]

Sonu et al.

[11] Patent Number: 4,531,165
[45] Date of Patent: Jul. 23, 1985

[54] AUTOMATIC AMPLITUDE EQUALIZER BASED UPON MONITORING OF CHANNEL POWER LOSS

[75] Inventors: Gene H. Sonu; Richard C. Schneider, both of Tucson, Ariz.

[73] Assignee: International Business Machines Corporation, Armonk, N.Y.

[21] Appl. No.: 538,005

[22] Filed: Sep. 30, 1983

[51] Int. Cl.³ ............................ G11B 5/45; G11B 5/02
[52] U.S. Cl. ......................................... 360/65; 360/67
[58] Field of Search ............................ 360/65, 67, 46; 333/182, 174, 28; 330/294

[56] References Cited

U.S. PATENT DOCUMENTS

| 3,660,821 | 5/1972 | Weber et al. | 360/65 |
| 4,081,756 | 3/1978 | Price et al. | 360/65 |
| 4,093,965 | 6/1978 | Gish | 360/65 |
| 4,459,554 | 7/1984 | Marrisson | 360/65 |

Primary Examiner—Vincent P. Canney
Attorney, Agent, or Firm—James M. Thomson

[57] ABSTRACT

An automatic amplitude equalizer for magnetic recording channels which utilizes a readback training sequence, monitors the total power lost during the training sequence due to channel variations, and automatically adjusts the channel signal in response to the power loss factor.

8 Claims, 7 Drawing Figures

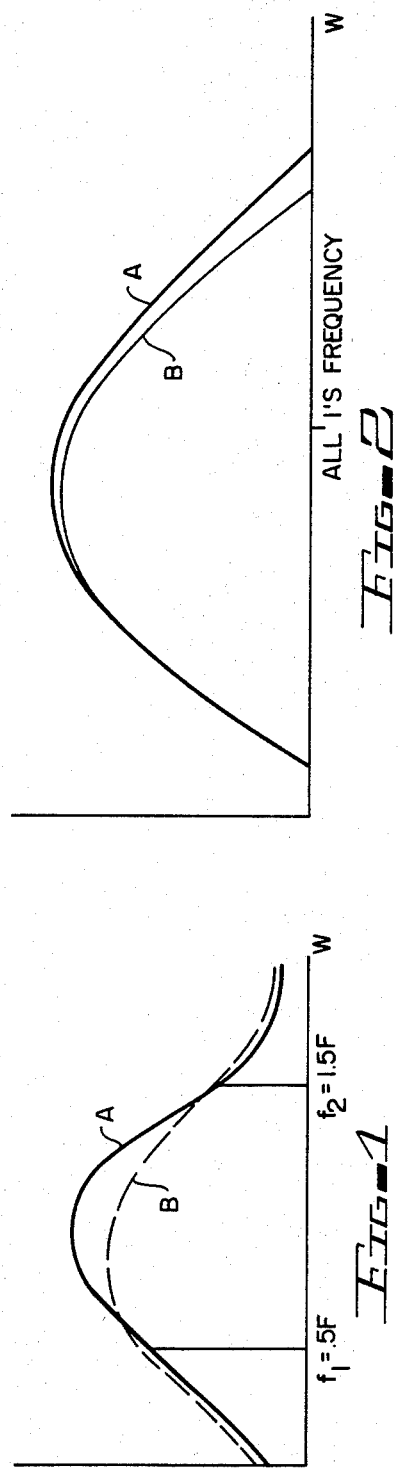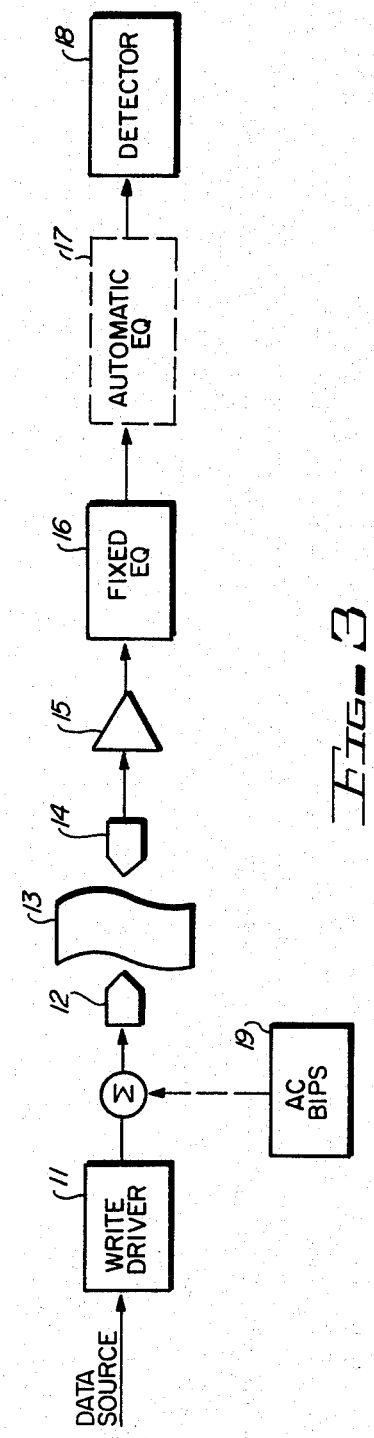

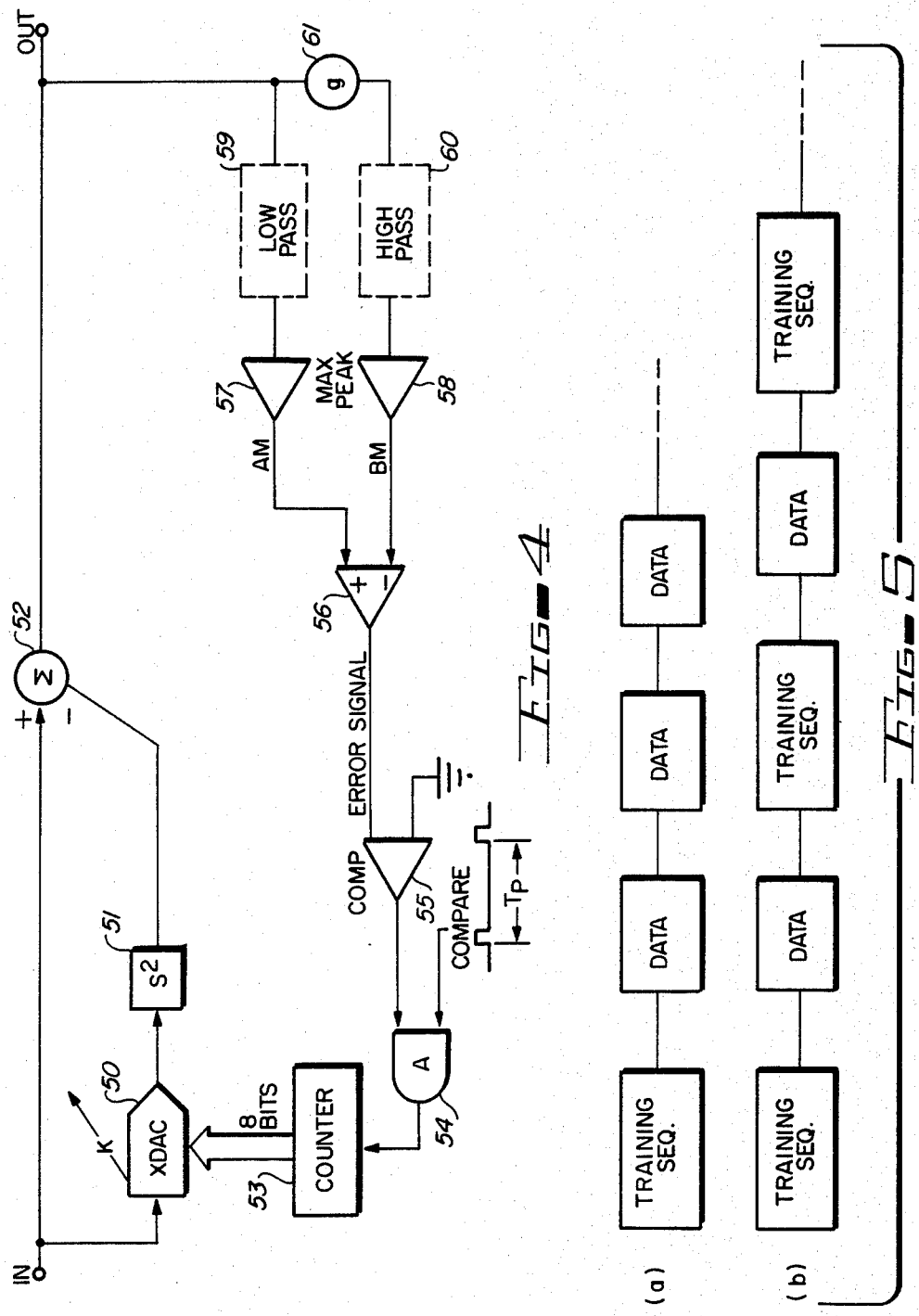

AUTOMATIC AMPLITUDE EQUALIZER BASED UPON MONITORING OF CHANNEL POWER LOSS

FIELD OF THE INVENTION

The invention relates to an automatic amplitude equalizer for magnetic recording channels. More particularly the invention concerns an equalizer which utilizes a readback training sequence and monitors the total power lost during the training sequence due to channel variations whereby the channel signal amplitude is automatically adjusted in response to the power loss factor.

DISCUSSION OF THE PRIOR ART

Recovery of data in magnetic recording channels is critically dependent upon the symmetrical quality and spacing of data pulses being processed in the recording channel electronics. Channel variations occur due to a variety of well known factors and have been overcome by providing active symmetrical equalization in recording channels for some time. The term symmetrical equalization in its simplest form can be taken to mean pulse shaping to achieve more ideal pulse spacing and pulse amplitude.

In the past, such equalization was performed by fixed equalization circuits within the recording channels. However, at present and projected recording densities and signal parameters, satisfactory equalization is no longer possible by fixed systems.

Other more advanced equalization techniques have been utilized that are improvements upon fixed equalization circuits. Among such methods is a so-called two frequency approach, which is an automatic equalization technique that utilizes a readback training sequence at the initiation of channel operations. During the readback of the training sequence, the signal level is measured at two frequencies, defined by band pass filters, and compensation is applied to the channel to compensate for channel variations that are measured at the two frequencies. Thus, automatic equalization is achieved such that the ratio of the signals at frequency 1 and frequency 2 is optimized to a desired gain factor.

It has been discovered that in most channels severe linear distortion arises at frequencies other than the two frequencies at which the ratio is optimized. The distortion is more severe with larger variations and can reach a level whereby an optimum compensation ratio is not possible with the equalizer functions currently being utilized.

Accordingly, a need exists in the art for an automatic amplitude equalization circuit for magnetic recording channels which is effective in the presence of severe linear distortion conditions and which can be implemented with low cost components.

SUMMARY OF THE INVENTION

Accordingly, it is an object of the invention to provide an extremely low cost, automatic amplitude equalizer for magnetic recording channels that is efficient in compensating for severe linear distortion at high recording densities.

These and other features are attained in an automatic amplitude equalizer which utilizes a readback sequence recorded or written at the beginning of tape every time data is recorded. When the training sequence is read back upon processing of data from the tape, the total power lost during the sequence due to channel variations is monitored, and the channel signal amplitude is adjusted in response to the power loss factor in order to equalize the channel to a desired level.

BRIEF DESCRIPTION OF THE DRAWINGS

The above and other features and advantages of the invention will become apparent from the following detailed description of the invention, when taken in conjunction with the accompanying drawings wherein:

FIG. 1 is a graph representing the ideal transfer function of a pulse before and after equalization utilizing the two frequency approach;

FIG. 2 is a graph of the ideal transfer function of a pulse before and after equalization utilizing the total power loss factor of the present invention; and FIG. 3 is a block diagram of a digital magnetic recording channel.

FIG. 4 is a schematic diagram of a preferred embodiment of a circuit for performing automatic amplitude equalization in accordance with the invention.

FIG. 5 is a timing diagram showing two possible arrangements of a training sequence and data signals.

DETAILED DESCRIPTION OF THE INVENTION

Figure 6:
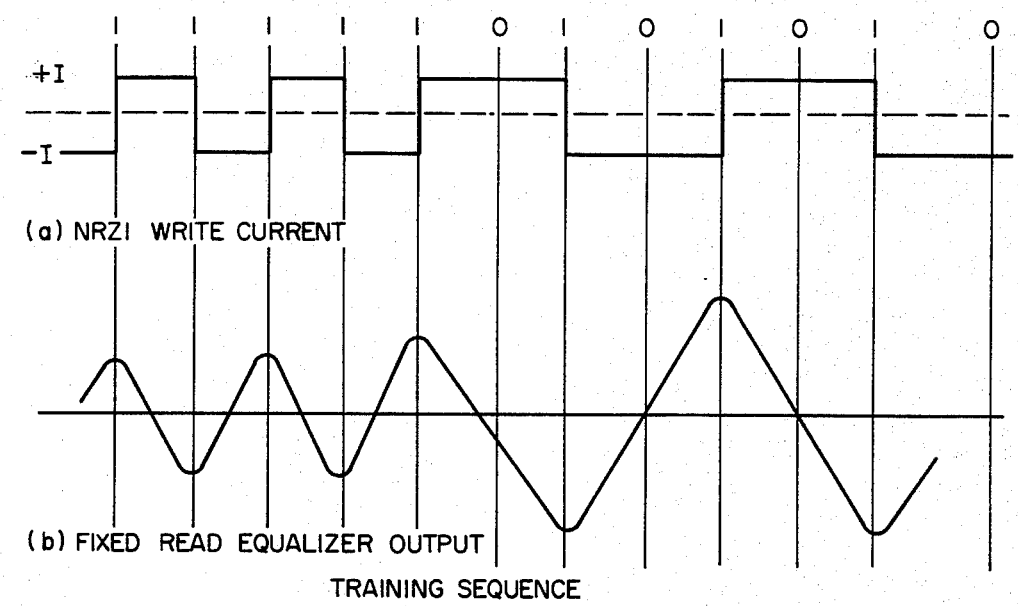
FIG. 6 is a more detailed timing diagram showing possible write and read signals for a training sequence.

Referring now to the drawings, a preferred embodiment of the invention will be described. In particular, FIG. 1 illustrates a plot of an ideal channel transfer function illustrated as curve A, and a curve B of the transfer function after automatic equalization utilizing the two frequency approach. In the figure F1 is selected to be 0.5 F and F2 is selected to be 1.5 F. As is apparent, equalization with the two frequency approach results in ideal compensation for distortion at F1 and F2. However, at the other frequencies, rather severe linear distortion arises. Moreover, it is believed that the larger the variation the more severe the distortion becomes at frequencies other than the compensated frequencies. Thus, FIG. 1 illustrates that the two frequency approach to automatic equalization is not satisfactory for high density, high speed data recording.

For purposes of comparison, the graph of FIG. 2 illustrates an ideal transfer function illustrated as curve A and a transfer function shown as curve B after equalization utilizing the power monitoring technique described in accordance with the present invention. As is apparent, the transfer function after equalization is quite closely matched with the ideal transfer function. Accordingly, the power loss monitoring technique of amplitude equalization is more effective than the two frequency approach.

Referring to FIG. 3, a block diagram of a digital magnetic recording channel is illustrated. In recording, write driver 11 directs a two-level write current into write head 12. AC bias from circuit 19 may be added if required to improve recording performance. Write head 12 permanently magnetizes magnetic media 13 with a sequence of flux patterns that alternate in polarity. There is a unique flux pattern recorded for each data sequence. In reading, read head 14 senses the recorded flux pattern as the media moves past. This signal is amplified by amplifier circuit 15. In high density recording, the signal may be further shaped by a fixed read equalizer 16. The read equalizer alters the signal magnitude and phase at different frequencies to make up for undesired losses in the recording and readback process. The signal is now ready for detection by detector 18. The above is all well known and understood in the prior art. Normally the fixed read equalizer 16 is designed to handle the average losses caused by the recording and readback process. In high density recording, it may be desirable to automatically adjust the read equalizer to more optimally compensate for the specific heads and media on each machine. This will improve the data reliability at high densities. This can be done by introducing an automatic equalizer 17 as shown in FIG. 3. The general concept of automatic equalizers is well known.

This invention relates to a new automatic equalizer that is simpler than previous known designs. It is a feature of this invention to read a recorded pattern that contains a large number of both high and low frequencies (rather than just one or two). As these signals are being read, the amount of compensation in the automatic equalizer is increased until the high frequency power loss has been eliminated.

FIG. 4 is a schematic of an embodiment demonstrating principal features of this invention. It has been found that the additional needed compensation can be achieved by increasing the magnitude of the high frequency content of the signals while not changing the signal phase. It is an objective of this invention to determine the amount of additional high frequency compensation required by comparing the high frequency power to the power in the rest of a training sequence that is written prior to the actual data to be detected. FIG. 5 illustrates two possible arrangements of training sequence and the data. In typical magnetic recording systems, data is written in groups called "records" or "blocks". FIG. 5(a) shows a single training sequence that precedes a number of data blocks. Thus, there could be only one training sequence for an entire tape reel, tape cartridge or magnetic disk. Alternatively, a training sequence could be placed before each data block such as shown in FIG. 5(b). It should be understood that other arrangements are possible.

The operation of the circuit of FIGS. 3 and 4 is as follows. A periodic data pattern is written on tape having a high density region and a low density region. An acceptable pattern is 111110101010 such as shown in FIG. 6(a). Other patterns having a high density region and low density region could also be used. Two such alternative patterns are: 111110010010010 and 101010101000100010001000. In the following discussion, the pattern of FIG. 6(a) is assumed. The recorded pattern is sensed by read head 14 amplified by circuit 15 and partially equalized by fixed read equalizer 16 of FIG. 3. The signal at the input of FIG. 4 will appear as the wave forms of FIG. 6(b).

Fixed read equalizer 6 is designed to ensure that even with the best heads and media, some extra compensation will be required. Thus, when first reading the training sequence, the circuit of FIG. 4 is in the state where the high density amplitude is lower than the low density amplitude at the output of summing amplifier 52. The multiplying digital to analog converter 50, second derivative circuit 51 and summing amplifier 52 add a variable amount of high frequency compensation to the input signal.

The amount of compensation added is determined by the output of counter 53. Initially the counter is set at zero and no compensation is added. The counter is incremented (counts up) by pulses gated by AND circuit 54. If the output of comparator 55 is high, pulses will be gated by AND circuit 54. If the output of comparator 55 is high, pulses will be gated through AND circuit 54 and increment the counter.

Figure 7:
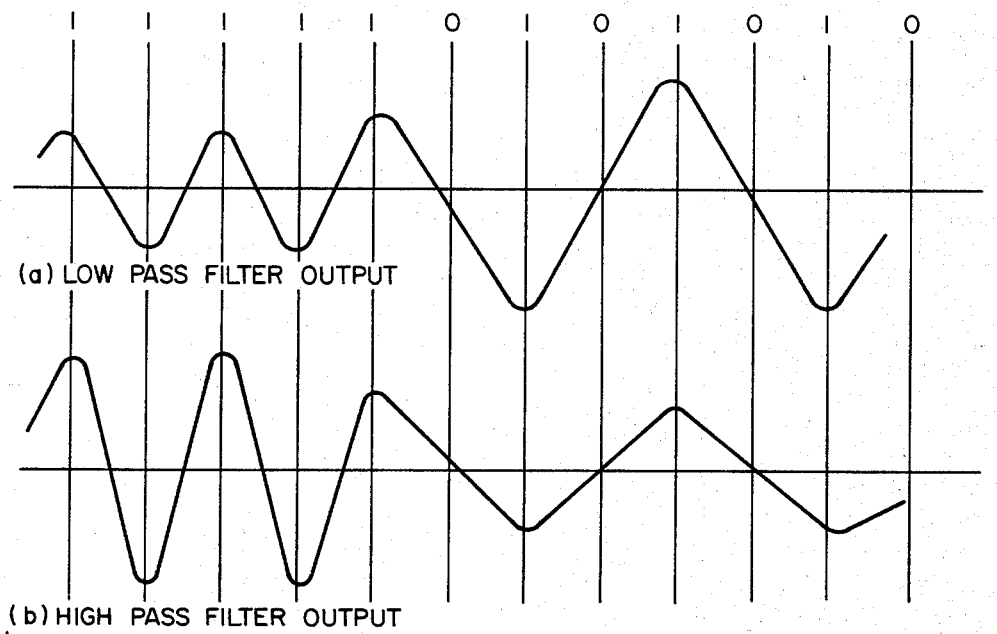
FIG. 7 shows signal wave forms that may appear at the output of low and high pass filters used in the preferred embodiment of this invention.

With no compensation added, the output of FIG. 3 is the same as the input. The output is tested to determine if the high and low density powers have the proper ratio. If the proper ratio exists, the pulses incrementing counter 53 will be degated (stopped) by bringing low the input to AND circuit 54 from comparator 55. The circuitry that determines whether the proper ratio is achieved consists of: comparator 55, summing amplifier 56, peak detectors 57 and 58, low pass filter 59, high pass filter 60 and gain compensation circuit 61. Low-pass filter 59 is designed to pass the low frequency (low density) portion of the output signal from summing amplifier 51 and to attenuate the high frequency (high density) portion of the signal. The attenuation is great enough to ensure that the low density portion of the signal has substantially higher amplitude than the high density portion of the signal at the output of low-pass filter 59. See FIG. 7(a).

The gain compensation circuit 61 is designed such that when the output signal of summing amplifier 52 has the proper ratio of high to low density amplitude, the high density output of high-pass filter 60 has the same amplitude as the low density output of low-pass filter 59. Peak detector 57 has an output proportional to the amplitude of the low density signal power since this is the maximum signal at its input. Peak detector 58 has an output proportional to the high density signal power since this is the maximum signal at its input.

The function of summing amplifier 56 and comparator 55 is to compare the outputs of peak detectors 57 and 58. If the output of peak detector 57 is greater than the output of peak detector 58, it means that the low density signal has higher amplitude than the high density. Then more compensation is required.

Under this condition, the output of the summing amplifier 56 will be positive. This causes the output of comparator 55 to be high which gates pulses through AND circuit 54. As the pulses increment counter 53 the increasing count increases the gain of multiplying digital-to-analog converter 50. Thus the amount of compensation continues to increase.

When the compensation reaches the correct value, the output of peak detector 58 will be slightly higher than the output of peak detector 57. This causes the output of comparator 55 to go low, thus preventing any further pulses from passing through AND circuit 54. The pulses coming into AND circuit 54 are only present during the training burst. Alternatively, a third input could be added to AND circuit 54 to degate the pulses at non-training burst times.

The circuit of FIG. 3 can be assembled with standard circuit components, some examples of which are given below.

| Component | Part Number | Company |
| --- | --- | --- |
| Counter 53 | 74193 | Texas Instruments |
| Digital to Analog Counter 50 | 5618A | Harris |

-continued

| Component | Part Number | Company |
| --- | --- | --- |
| Peak detectors 57, 58 | ua760 IN914 diode | Fairchild Motorola |
| Summing amplifier 52 | 5195 | Harris |

The high frequency compensation circuit 51 can be approximated by a second order high pass function:

$$\frac{S^2}{S^2 + \frac{W_o}{Q} S + W^2}$$

This can be implemented by any number of well known active or passive networks. It should be recognized that the cost of providing power measurement circuitry within the parallel compensation paths is much higher than the provision of peak detecting circuitry. The use of peak detectors 57 and 58 is made possible, in that, in a repetitive wave form such as the training sequence of FIG. 6, the power is proportional to the amplitude of the peak signal.

The automatic equalization circuit illustrated in FIG. 3 is advantageous in that it functions over the frequency band where channel variations occur. The use of a high pass filter takes advantage of the fact that the channel variations occur in the form of poor high frequency response. Moreover, the use of a training sequence spectrum facilitates approximation of power values by peak values, and in turn results in the use of less complex peak detection hardware.

What is claimed is:

1. An automatic amplitude equalizer for magnetic recording channels which utilizes a readback training sequence written at the beginning of data every time data is recorded, including:
a summation amplifier receiving the data channel output as one input and a variable feed forward signal from a compensation amplifier as another input signal,
feedback detector means receiving the summation amplifier output for sensing the power lost due to channel variations during the reading of the training sequence, and
means responsive to the detector means for varying the feed forward signal in response to the power loss error signal.

2. The automatic equalizer of claim 1 wherein peak detectors are used to detect the peak amplitude of the filtered training sequence signal which amplitude is proportional to the power of said filtered signals.

3. The automatic equalizer of claim 1 wherein the amount of added compensation is increased until the high frequency power loss is corrected thus minimizing the linear distortion of the magnetic recording channel.

4. The automatic equalizer of claim 1 including a fixed gain adjustment such that the amount of high frequency power to low frequency power can be compensated to any desired ratio.

5. The automatic amplitude equalizer of claim 1 wherein the feedback detector means comprise two separate channels for sensing power loss due to channel variation at different frequencies.

6. The circuit of claim 5 wherein the means responsive to the detector means includes an up-down counter that receives a signal from a summation amplifier responsive to both channels.

7. The automatic amplitude equalizer of claim 6 wherein one channel monitors a frequency defined by a low pass filter and the other channel monitors a frequency defined by a high pass filter.

8. The automatic amplitude equalizer of claim 1 wherein the feed forward signal channel includes a high frequency compensation circuit approximated by the second order high pass function:

$$\frac{S^2}{S^2 + \frac{W_o}{Q} S + W^2}$$

* * * * *